United States Patent
Kim et al.

(10) Patent No.: US 7,163,293 B2
(45) Date of Patent: *Jan. 16, 2007

(54) PROJECTION SYSTEM AND METHOD

(75) Inventors: Dae-sik Kim, Gyeonggi-do (KR);
Kun-ho Cho, Gyeonggi-do (KR);
Suna-ha Kim, Seoul (KR); Hee-Joong Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 148 days.

This patent is subject to a terminal disclaimer.

(21) Appl. No.: 10/644,883

(22) Filed: Aug. 21, 2003

(65) Prior Publication Data
US 2004/0061839 A1 Apr. 1, 2004

(30) Foreign Application Priority Data
Aug. 24, 2002 (KR) .................. 10-2002-0050307

(51) Int. Cl.
*G03B 21/004* (2006.01)
*G02F 1/1335* (2006.01)

(52) U.S. Cl. .................. 353/31; 353/94; 349/62; 348/804

(58) Field of Classification Search .......... 353/30–34, 353/81, 84, 100, 101, 122, 37, 94, 20, 28, 353/97; 359/891, 694–696, 811–814, 889–892; 348/759, 771, 761, 762, 766, 742, 743, 804; 349/5, 7–9, 62
See application file for complete search history.

(56) References Cited

U.S. PATENT DOCUMENTS

| | | | | |
|---|---|---|---|---|
| 5,022,750 A | * | 6/1991 | Flasck | 349/10 |
| 5,969,832 A | * | 10/1999 | Nakanishi et al. | 359/15 |
| 6,219,110 B1 | * | 4/2001 | Ishikawa et al. | 348/759 |
| 6,224,216 B1 | * | 5/2001 | Parker et al. | 353/31 |
| 6,288,815 B1 | | 9/2001 | Lambert | 359/196 |
| 6,508,554 B1 | * | 1/2003 | Hatakeyama et al. | 353/31 |
| 6,511,184 B1 | * | 1/2003 | Yamagishi et al. | 353/31 |
| 6,547,398 B1 | * | 4/2003 | Cho et al. | 353/31 |
| 6,547,400 B1 | * | 4/2003 | Yokoyama | 353/98 |
| 6,594,090 B1 | * | 7/2003 | Kruschwitz et al. | 359/707 |
| 6,619,802 B1 | * | 9/2003 | Janssen et al. | 353/31 |

(Continued)

FOREIGN PATENT DOCUMENTS

CN 1195782 10/1998

OTHER PUBLICATIONS

U.S. Appl. No. 10/644,933, filed Aug. 21, 2003, Kun-ho Cho, et al., Samsung Electronics Co., Ltd.

Primary Examiner—W. B. Perkey
Assistant Examiner—Andrew Sever
(74) Attorney, Agent, or Firm—Staas & Halsey LLP

(57) ABSTRACT

A projection system including light emitting units, a scrolling unit, and a light valve. The light emitting units emitting light beams of different wavelengths. The scrolling unit has spirally arranged cylinder lens cells which separate the light beams into color beams and scroll the color beams when the scrolling unit is rotated. The light valve receives, at different positions, the color beams transmitted by the scrolling unit and forms a color image by turning pixels on or off according to an input image signal.

24 Claims, 6 Drawing Sheets

U.S. PATENT DOCUMENTS

2001/0048801 A1* 12/2001 Saccomanno ............... 385/147
2002/0005914 A1    1/2002 Tew ........................... 348/743
2003/0007134 A1*  1/2003 Maximus ..................... 353/31
2004/0046946 A1*  3/2004 Kim ........................... 353/101
2004/0105077 A1*  6/2004 Kim et al. .................... 353/31

* cited by examiner

PROJECTION SYSTEM AND METHOD

CROSS-REFERENCE TO RELATED APPLICATIONS

This application claims the benefit of Korean Application No. 2002-50307, filed Aug. 24, 2002, in the Korean Intellectual Property Office, the disclosure of which is incorporated herein by reference.

BACKGROUND OF THE INVENTION

1. Field of the Invention

The present invention relates to a projection system, and more particularly, to a projection system of the single panel type which is optically efficient and compact.

2. Description of the Related Art

Projection systems are classified into 3-panel projection systems and single-panel projection systems according to the number of light valves for controlling the on/off operation of light emitted from a high-output lamp on a pixel-by-pixel basis and forming a picture. Single-panel projection systems can have a smaller optical system than three-panel projection systems but provide an optical efficiency of ⅓ of that of three-panel projection systems because the red (R), green (G), and blue (B) colors into which white light is separated are used in a sequential method. Hence, attempts to increase the optical efficiency of single-panel projection systems have been made.

Generally, in a single-panel projection system, light radiated from a white light source is separated into R, G, and B colors using a color filter, and the three colors are sequentially sent to a light valve. The light valve appropriately operates according to the sequence of colors received and creates images. As described above, a single-panel optical system sequentially uses colors, so the light efficiency is reduced to ⅓ of the light efficiency of a three-panel optical system. A scrolling method has been proposed to solve this problem. In a color scrolling method, white light is separated into R, G, and B colors, and the three colors are sent to different locations on a light valve. Since an image is produced when all of the R, G, and B colors for each pixel reach the light valve, color bars are moved at a constant speed using a variety of methods.

In a conventional single-panel scrolling projection system, as shown in FIG. 1, white light emitted from a light source 100 passes through first and second lens arrays 102 and 104 and a polarized beam splitter array 105 and is separated into R, G, and B beams by first through fourth dichroic filters 109, 112, 122, and 139. To be more specific, the red beam R and the green beam G, for example, are transmitted by the first dichroic filter 109 and advance along a first light path I1, while the blue beam B is reflected by the first dichroic filter 109 and travels along a second light path I2. The red beam R and the green beam G on the first light path I1 are separated by the second dichroic filter 112. The second dichroic filter 112 transmits the red beam R along the first light path I1 and reflects the green beam G along a third light path I3. The projection system also includes various lenses 107, 117, 120, 131, 137, 140, and 145.

As described above, the light emitted from the light source 100 is separated into the red beam R, the green beam G, and the blue beam B, which are scrolled while passing through corresponding first through third prisms 114, 135, and 142. The first through third prisms 114, 135 and 142 are disposed on the first through third light paths I1, I2, and I3, respectively, and rotate at a uniform speed such that R, G, and B color beams are scrolled. I2 includes a mirror 133. The green beam G and the blue beam B that travel along the second and third light paths I2 and I3, respectively, are transmitted and reflected by the third dichroic filter 139, respectively, and then combined. Finally, the R, G, and B beams are combined by the fourth dichroic filter 122. The combined beam passes through a polarized beam splitter 127 and forms a picture using a light valve 130.

The scrolling of the R, G, and B color bars by the rotation of the first through third prisms 114, 135, and 142 is shown in FIG. 2. Scrolling represents the movement of color bars formed on the surface of the light valve 130 when prisms corresponding to the R, G, and B colors are synchronously rotated.

The light valve 130 processes picture information depending on an on-off signal for each pixel and forms a picture. The formed picture is magnified by a projecting lens (not shown) and is projected onto a screen.

The light source 100 may be, by way of non-limiting example, a xenon lamp, a metal-halide lamp, an UHP lamp, or the like. These lamps are not without disadvantages. They emit many unnecessary infrared rays and ultraviolet rays and generate a great amount of heat, and accordingly necessitate a cooling fan. But, the cooling pan can cause noise. Also, the lamp light source has a narrow color spectrum which reduces the width of color selection, degrades color purity, and cannot be stably used because of its short life. In addition, because the light source 100 emits white light, color filtering units, such as, dichroic filters, are required to separate the white light according to a wavelength. Thus, reducing the size of a projection system is difficult.

Since the conventional single-panel scrolling projection system uses different light paths provided for individual colors, a light path correction lens must be provided for each color, and a component part for re-collecting separated light beams must be provided for each color. Accordingly, an optical system becomes larger, and the yield degrades due to a complicated manufacturing and assembling process. In addition, a large amount of noise is generated due to the driving of three motors for rotating the first through third prisms 114, 135, and 142, and the manufacturing costs of the conventional projection system is higher than a color wheel method adopting only one motor.

In order to produce a color picture using a scrolling technique, color bars as shown in FIG. 2 must be moved at a constant speed. Since the conventional projection system must synchronize a light valve with three prisms in order to achieve scrolling, controlling the synchronization is not easy.

SUMMARY OF THE INVENTION

The present invention provides a projection system which may be small in size and may exhibit light efficiency by employing a plurality of light emitting units for emitting beams with different wavelengths as a light source and including a scrolling unit to achieve scrolling.

According to an aspect of the present invention, there is provided a projection system including: light emitting units emitting light beams of different wavelengths; a scrolling unit having spirally arranged cylinder lens cells which separate the light beams into color beams and scroll the color beams when the scrolling unit is rotated; and a light valve that receives the color beams transmitted by the scrolling unit and forms a color image by turning pixels on or off according to an input image signal.

The projection system further includes first and second fly-eye lenses which receive the beams emitted from the light emitting units and transmitted by the scrolling unit and transmit the beams to the light valve.

The projection system further includes a relay lens that is disposed on a light path between the second fly-eye lens and the light valve to focus the color beams transmitted by the second fly-eye lens on their respective color areas of the light valve.

Each of light emitting units may be one of an LED, a laser diode, an organic EL, and an FED.

According to another embodiment of the present invention, there is provided a method of projecting an image, including: emitting light beams of different wavelengths; separating the emitted light beams into a plurality of color beams and scrolling the color beams by rotating an optical element arranged so that rotation thereof simulates linear movement of the optical element; focusing the color beams onto a light valve so as to form color bars corresponding to each of the colors in the plurality of color beams, the color beams received at different locations on the light valve; and turning pixels of the light valve one of on and off according to a received image signal.

According to still another embodiment of the present invention, there is provided a projector including: a light emitting unit having a plurality of light emitting elements that emit light beams of different wavelengths along a light path; a scrolling unit rotatably disposed along the light path and having a plurality of spirally arranged cylinder lens cells that, when the scrolling unit is rotated, separate the light beams into color beams and scroll the color beams; and a light valve disposed at an end of the light path and forming a color image by receiving, at different locations, color beams transmitted from the scrolling unit and turning pixels one of off and on in accordance with an input image signal.

According to yet another aspect of the present invention, there is provided a projection system including: a plurality of light emitters each emitting a light beam of a wavelength corresponding to a different color, the light emitters disposed at a light emitting end of a light path; a light valve which forms a color image by turning pixels one of on and off according to an input image signal, the light valve disposed at an image forming end of the light path; a collimator lens disposed in the light path between the plurality of light emitters and the light valve, the collimator transmitting incident light beams at least nearly parallel; a scrolling unit rotatably disposed on the light path between the collimator lens and the light valve, the scrolling unit receiving incident light beams, separating the incident light beams into color beams, and scrolling the color beams so that they are received by the light valve at different portions thereof; and a pair of fly-eye lenses disposed on the light path between the scrolling unit and the light valve which receive the scrolling color beams and focus the color beams onto relay lens disposed on the light path between the pair of fly-eye lenses and the light valve and transmits to the light valve received color beams from the pair of fly-eye lenses.

According to yet another aspect of the present invention, there is provided an image projector including: light emitters which emit light beams of different wavelengths; a rotatable scrolling unit which separates the emitted light beams into a plurality of color beams and, when rotated, scrolls the color beams so as to simulate linear movement of the scrolling unit; a light valve which turns pixels on and off according to a received image signal; and a color beam focusing unit which focuses the color beams onto the light valve so as to form color bars corresponding to each of the colors of the plurality of color beams, the color bars received at different locations on the light valve due to the scrolling.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the preferred embodiments taken in conjunction with the accompanying drawings in which.

DETAILED DESCRIPTION OF THE PREFERRED EMBODIMENTS

Figure 1:
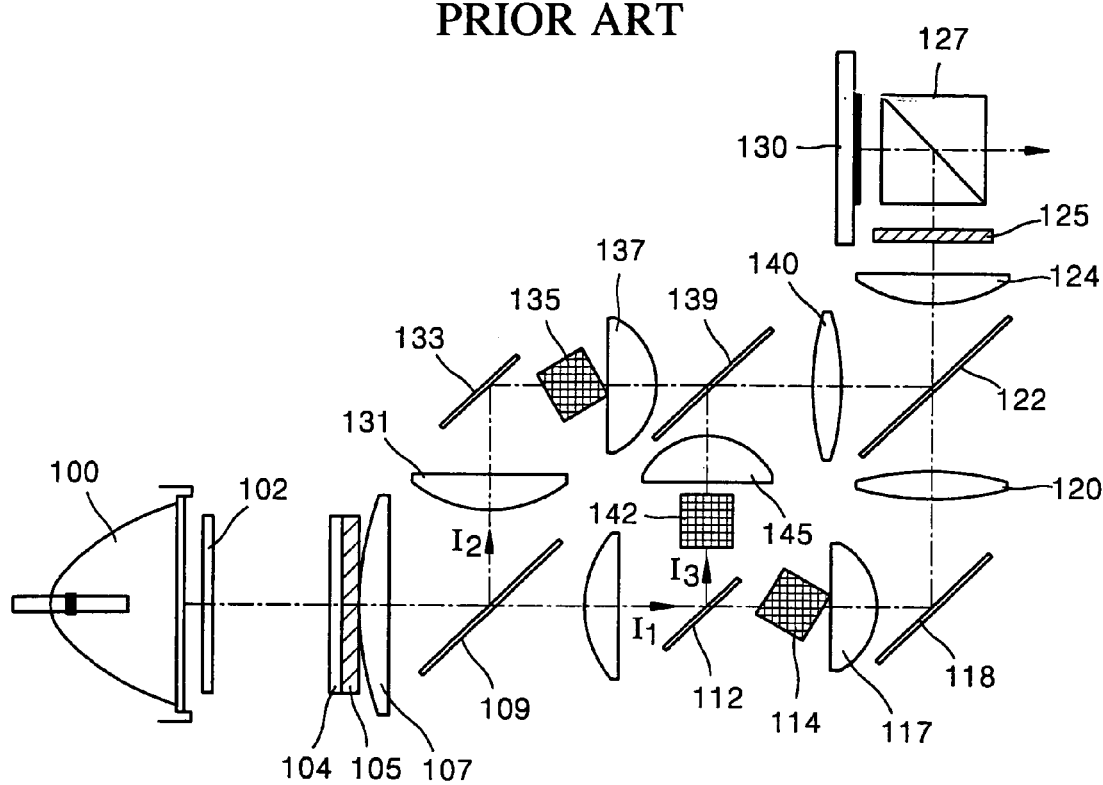
FIG. 1 shows a conventional scrolling projection system.
Figure 2:
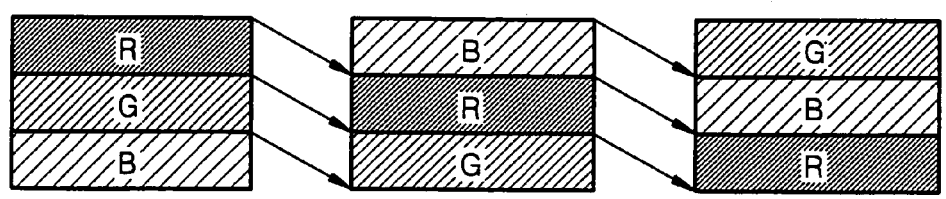
FIG. 2 shows R, G, and B color bars to explain the color scrolling operation of a projection system.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 3:
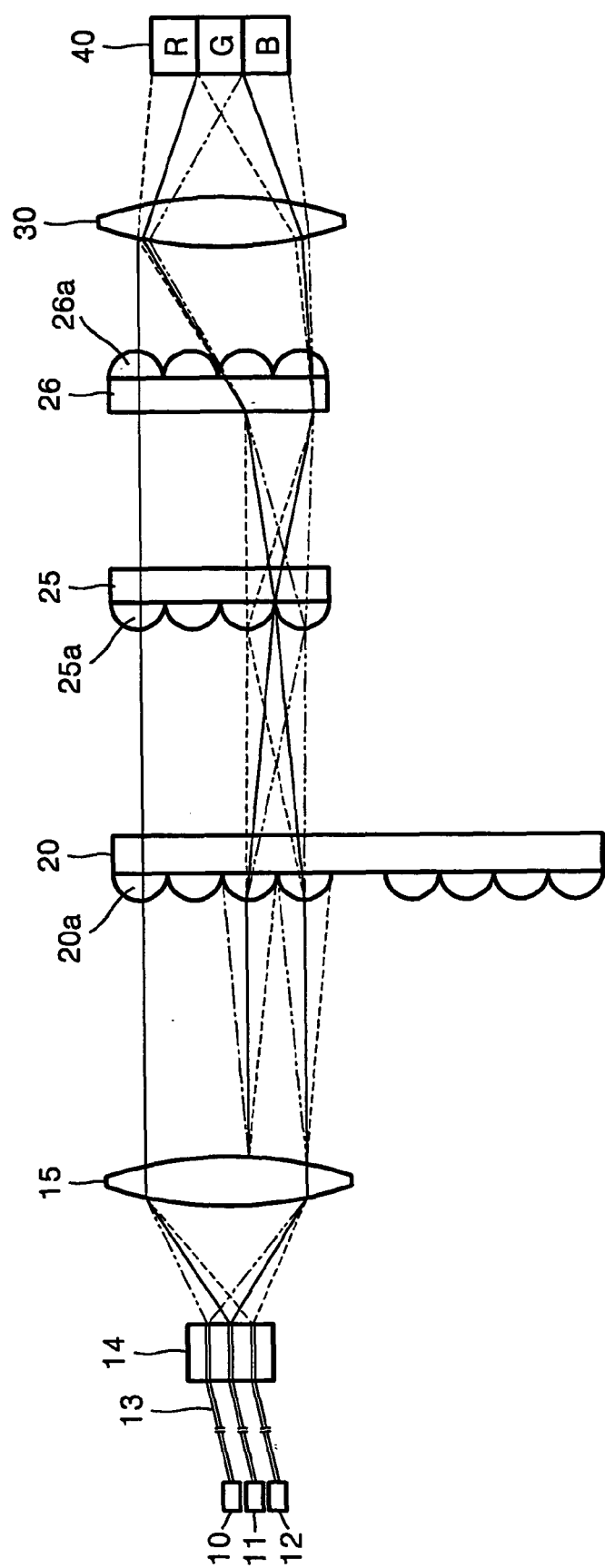
FIG. 3 shows a projection system according to an embodiment the present invention.

Referring to FIG. 3, a projection system according to an embodiment of the present invention includes first, second, and third light emitting units 10, 11, and 12, a scrolling unit 20, and a light valve 40. The first, second, and third light emitting units 10, 11, and 12 radiate or emit beams at different wavelengths. The scrolling unit 20 scrolls the beams radiated by the first, second, and third light emitting units 10, 11, and 12. The light valve 40 forms an image by turning on or off its pixels according to an image signal. First and second fly-eye lenses 25 and 26 and a relay lens 30 may also be disposed along the light path between the scrolling unit 20 and the light valve 40.

The first, second, and third light emitting units 10, 11, and 12 may comprise, by way of non-limiting example, one of a laser diode, an LED, an organic EL, and an FED. For example, the first light source 10 radiates a beam with a red (R) wavelength, the second light source 11 radiates a beam with a green (G) wavelength, and the third light source 13 radiates a beam with a blue (B) wavelength. As described above, since beams with desired wavelengths are individually radiated, an optical separator for separating light according to a wavelength is not required.

A collimating lens 15 for collimating incident beams is disposed on the light path between the first through third light emitting units 10 through 13 and the scrolling unit 20.

Optical fibers 13 for guiding beams are disposed between each of the first through third light emitting units 10 through 13 and the collimating lens 15. Reference numeral 14 denotes a connector which which may be used to provide optional support for the optical fibers 13.

The beams transmitted by the collimating lens 15 are incident in parallel upon the scrolling unit 20 and then separated into R, G, and B beams and focused on the first fly-eye lens 25. Preferably, the first fly-eye lens 25 is located such as to face a focal plane of the scrolling unit 20. The first and second fly-eye lenses 25 and 26 include a plurality of lens cells 25$a$ and a plurality of lens cells 26$a$, respectively, which are two-dimensionally arranged. The R, G, and B beams transmitted by the first fly-eye lens 25 are focused on each of the lens cells 26$a$ of the second fly-eye lens 26 so that R, G, and B color lines are formed. Thereafter, the R, G, and B color beams pass through the relay lens 30 and are then focused on different areas of the light valve 40 so that R, G, and B color bars are formed. In other words, a color bar image formed by the scrolling unit 20 passes through each of the lens cells 25$a$ and 26$a$ of the first and second fly-eye lenses 25 and 26. The relay lens 30 receives the color bar image from the first and second fly-eye lenses 25 and 26 and transmits R, G, and B color beams on different areas of the light valve 40, thereby forming color bars.

Figure 4:
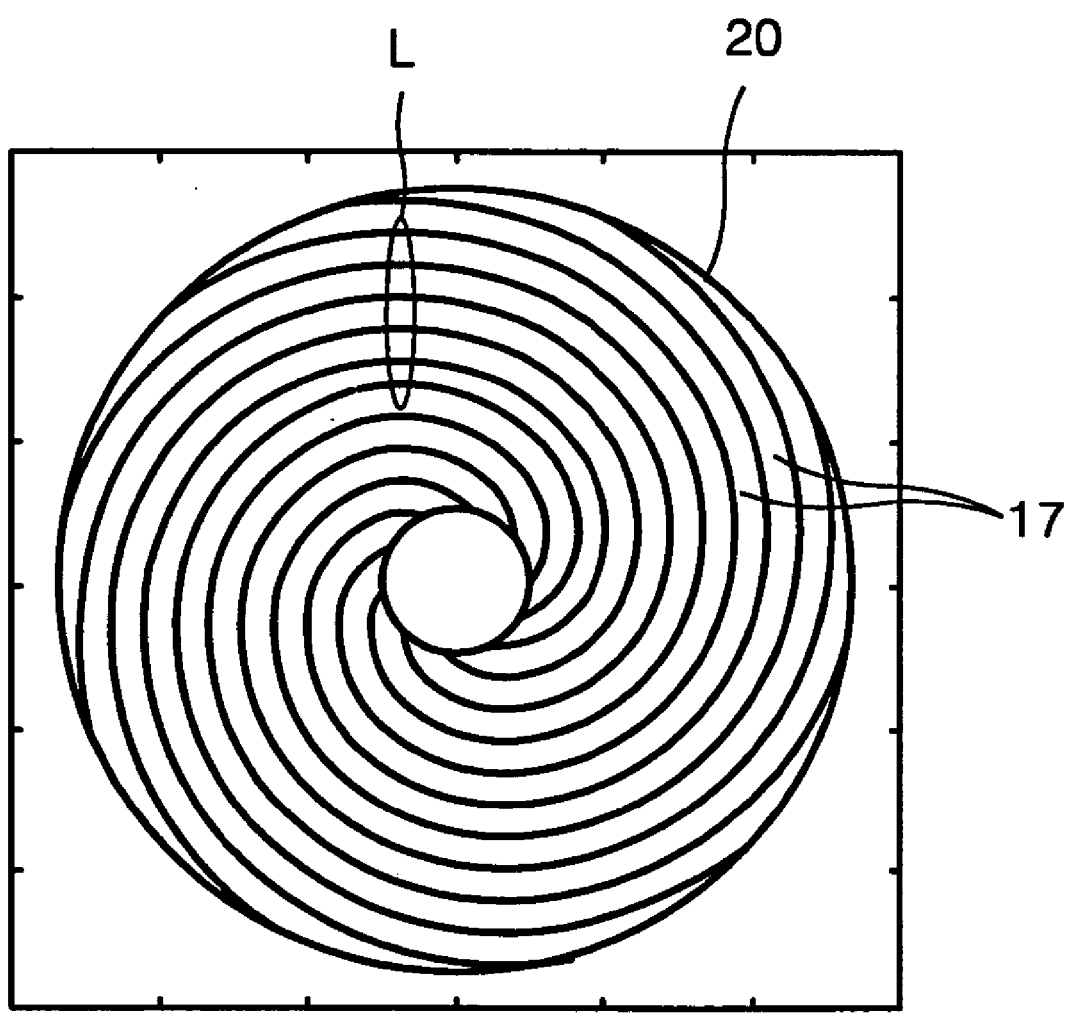
FIG. 4 shows a scrolling unit used in the projection system illustrated in FIG. 3.

Referring to FIG. 4, the scrolling unit 20 is formed by spirally arranging cylinder lens cells 17 and is rotatable. The cylindrical lens disk 20 includes at least two cylinder lens cells 17 to achieve color scrolling. However, it is to be understood that the scrolling unit 20 may be comprised of three or more cylinder lens cells. In FIG. 4, the R, G, and B beams transmitted by the scrolling unit 20 are indicated by reference character L. When the scrolling unit 20 rotates at a uniform speed, the same effect as when the cylinder lens array in the area through which beams pass linearly moves is obtained. As described above, the rotation of the scrolling unit 20 simulates rectilinear motion thereof, thereby achieving scrolling.

Figure 5:
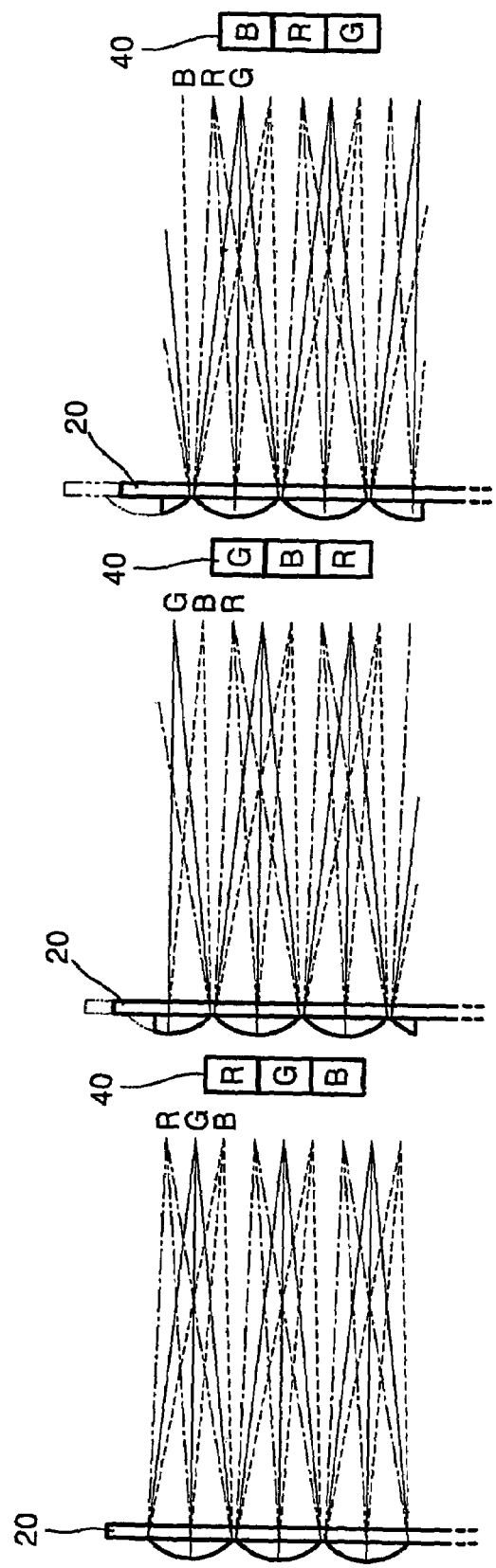
FIG. 5 illustrates a color scrolling operation performed with the rotation of the scrolling unit illustrated in FIG. 4 used in the projection system illustrated in FIG. 3.

In the scrolling operation of the scrolling unit 20, referring to FIG. 5, beams with different wavelengths radiated from the first through third light emitting units 10 through 12 are incident upon the scrolling unit 20. R, G, and B beams transmitted by the scrolling unit 20 are focused at different locations on the light valve 40. Although the R, G, and B beams pass through the scrolling unit 20 that rotates at a constant speed, the locations of the lens cells 17 through which the R, G, and B beams pass are the same as when the R, G, and B beams pass through the scrolling unit 20 that moves up and down at a uniform speed. Hence, an effect where the positions of the beams transmitted by the scrolling unit look to be continuously changing can be produced. This process is shown in FIG. 5.

As shown in FIG. 5, first, light passes through the scrolling unit 20, the first and second fly-eye lenses 25 and 26, and the relay lens 30 and forms color bars on the light valve 40 in an R, G, and B order. Next, as the scrolling unit 20 rotates, the lens array of the scrolling unit 20 gradually moves upward while the light passes through the scrolling unit 20, thus forming color bars in a G, B, and R order. Then, as the scrolling unit 20 rotates, the color bars are scrolled into a B, R, and G order. In other words, the locations of lenses upon which beams are incident change according to the rotation of the scrolling unit 20, and the rotation of the scrolling unit 20 is converted into a rectilinear motion of a cylinder lens cell array at the cross-section of the scrolling unit 20 so that scrolling is performed. Such scrolling is repeated. As a result, a single-panel projection system can achieve scrolling with the scrolling unit 20.

Since scrolling is performed by continuously rotating the scrolling unit 20 in one direction without changing the rotation direction, continuity and consistency may be achieved. In addition, since scrolling is performed using a single scrolling unit, the scrolling speed of color bars may be kept constant.

Thereafter, light converged by the scrolling unit 20 is diverged while passing through the first and second fly-eye lenses 25 and 26. The diverged light (i.e., R, G, and B beams) passes through the relay lens 30 and are then focused on their respective color areas of the light valve 40.

The number of cylinder lens cells 17 on the scrolling unit 20 can be controlled to synchronize the scrolling unit 20 with the operating frequency of the light valve 40. That is, if the operating frequency of the light valve 40 is high, more lens cells are included so that the scrolling speed can be increased while keeping the rotation speed of the scrolling unit constant.

Alternatively, a scrolling unit can be synchronized with the operating frequency of a light valve by maintaining the number of lens cells on the scrolling unit uniform and increasing the rotation frequency of the scrolling unit. For example, when the operating frequency of the light valve 40 is 960 Hz, that is, when the light valve 40 operates at 1/960 of a second per frame such that 960 frames are reproduced per second, a scrolling unit can be constructed as follows. If the scrolling unit 20 reproduces 32 frames per one rotation, it must rotate 30 times per second in order to reproduce 960 frames per second. At this speed, the scrolling unit 20 must rotate 1800 times for 60 seconds, and accordingly it has a rotation speed of 1800 rpm. When the operating frequency of the light valve is increased by half and thus the light valve operates at 1440 Hz, a scrolling unit must rotate at a 2700 rpm in order to be synchronized with the increased operating frequency of the light valve.

Figure 6A:
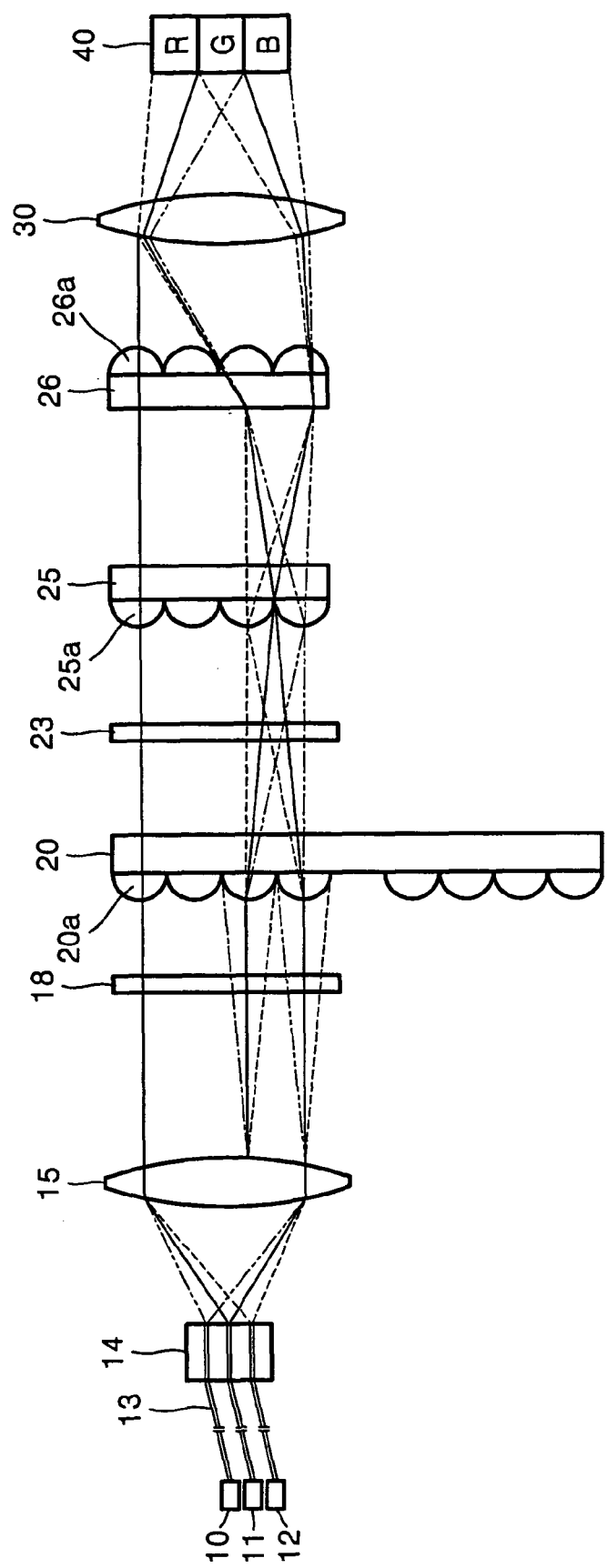
FIG. 6A shows the locations of a pair of cylinder lenses included in the projection system illustrated in FIG. 3.
Figure 6B:
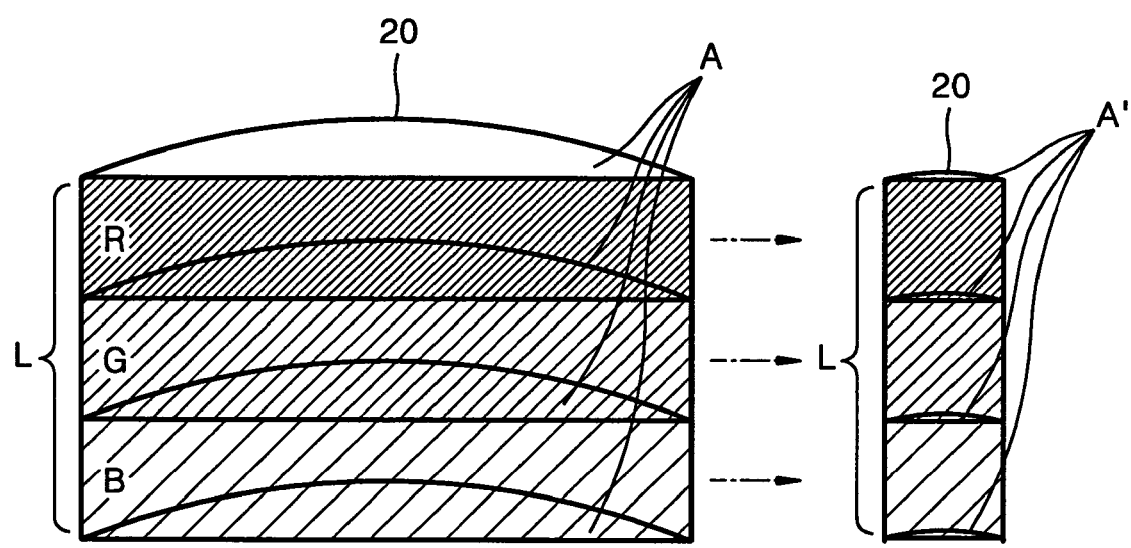
FIG. 6B shows a difference between the size of a beam incident upon a scrolling unit when a pair of cylinder lenses are not included in the projection system illustrated in FIG. 3 and the size of a beam incident upon the scrolling unit when a pair of cylinder lenses are included in the projection system illustrated in FIG. 6A.

As shown in FIG. 6A, first and second cylinder lenses 18 and 23 may be provided along a light path between the collimating lens 15 and the first fly-eye lens 25. The first and second cylinder lenses 18 and 23 control the widths of beams emitted from the first through third light emitting units 10 through 12. Referring to FIG. 6B, a beam that is emitted from one of the first through third light emitting units 10 through 12 and incident upon the scrolling unit 20 without passing through the first cylinder lens 18 is compared to a beam that has a width reduced by the first cylinder lens 18 and then is incident upon the scrolling unit 20.

When a beam L passing through the scrolling unit 20 is relatively wide as shown in the left drawing of FIG. 6B, the shape of the lens cell 17 does not match with that of the beam L due to the curvature of the scrolling unit 20, and thus light loss due to an unmatched area A for each color results. To minimize the light loss, the first cylinder lens 18 may be provided to reduce the width of the beam L so that the shape of the lens cell 17 matches with that of the beam L as much as possible. Hence, if an unmatched area when the width of the beam L passing through the scrolling unit 20 is reduced is A', A' is smaller than A. Consequently, the light loss is reduced. Thereafter, a beam transmitted by the scrolling unit 20 is collimated by the second cylinder lens 23. As described above, light loss can be reduced by controlling the width of a beam using the first and second cylinder lenses 18 and 23. Next, a beam transmitted by the first and second cylinder lenses 18 and 23 is focused on the light valve via the first and second fly-eye lenses 25 and 26 and the relay lens 30. The first and second fly-eye lenses 25 and 26 and the relay lens 30 are the same as those in FIG. 3, and thus detailed description is omitted.

As described above, in the present invention, an optical separating unit is not required because light emitting units for emitting beams with different wavelengths are used as a light source. Thus, a smaller projection system can be obtained. In addition, because scrolling can be performed using a single scrolling unit, the scrolling is easily controlled, the number of components is reduced, and a light, low-price projection system can be obtained.

Furthermore, since a conventional single-panel projection system produces color images by sequentially separating white light into R, G, and B light beams, the efficiency of light to be used by a light valve is degraded to ⅓ of the light efficiency of a three-panel projection system. However, in a single-panel projection system adopting a scrolling technique according to the present invention, three color beams are radiated directly from the light emitting units without the need to sequentially separate white light. Therefore, the single-panel projection system according to the present invention can obtain the same light efficiency as the light efficiency of a three-panel projection system.

Although a few embodiments of the present invention have been shown and described, the present invention is not limited to the disclosed embodiments. Rather, it would be appreciated by those skilled in the art that changes and modifications may be made in this embodiment without departing from the principles and spirit of the invention, the scope of which is defined by the claims and their equivalents.

What is claimed is:

1. A projection system comprising:
   light emitting units emitting light beams of different wavelengths;
   optical fibers disposed between the light emitting units and a collimating lens to respectively transmit the light beams;
   a scrolling unit having at least two discrete cylinder lenses spirally arranged to form at least two spiraling cells respectively corresponding to the at least two discrete cylinder lenses on a single disk which separate the light beams into color beams and scroll the color beams when the scrolling unit is rotated;
   a light valve that receives the color beams transmitted by the scrolling unit and forms a color image by turning pixels on or off according to an input image signal;
   first and second fly-eye lenses which receive the color beams transmitted by the scrolling unit, diverge the color beams, and transmit the color beams to the light valve;
   a first cylinder lens disposed between the light emitting units and the scrolling unit to control a width of the light beams emitted by the light emitting units; and
   a second cylinder lens paired with the first cylinder lens and disposed between the scrolling unit and the second fly-eye lens to collimate the color beams transmitted by the scrolling unit, the first and second cylinder lenses cooperating to control the width of the light beams incident upon the scrolling unit and the color beams on the first fly-eye lens.

2. The projection system of claim 1, further comprising a relay lens that is disposed on a light path between the second fly-eye lens and the light valve to focus the color beams transmitted by the second fly-eye lens onto respective color areas of the light valve.

3. The projection system of claim 2, wherein the light emitting units are one of an LED, a laser diode, an organic EL, and an FED.

4. The projection system of claim 1, further comprising a collimating lens that collimates the light beams emitted from the light emitting units.

5. The projection system of claim 1, wherein the light emitting units are one of an LED, a laser diode, an organic EL and an FED.

6. The projection system of claim 1, wherein the first and second fly-eye lenses have a plurality of 2 dimensionally arranged lens cells.

7. The projection system of claim 1, wherein the first fly-eye lens is disposed at a focal plane of the scrolling unit and the color beams transmitted from the scrolling unit are focused on the first fly-eye lens.

8. The projection system of claim 1, wherein the scrolling unit has at least two cylinder lens cells.

9. The projection system of claim 1, wherein the scrolling unit has a number of cylinder lens cells equal to a number of the light emitting units.

10. The projection system of claim 1, wherein the scrolling unit has 3 cylinder lens cells.

11. The projection system of claim 1, wherein the scrolling unit is rotated at a constant speed in a direction.

12. The projection system of claim 1, wherein a scrolling speed of the scrolling unit is synchronized with an operating frequency of the light valve.

13. The projection system of claim 12, wherein an increase in one of the number of cylinder lens cells and the rotational speed of the scrolling unit increases the scrolling speed.

14. The projection system of claim 12, wherein a decrease in one of the number of cylinder lens cells and the rotational speed of the scrolling unit decreases the scrolling speed.

15. The projection system of claim 1, wherein the scrolling unit is a single optical element.

16. The projection system of claim 1, wherein the light emitting units emit three color beams, one color beam having a wavelength corresponding to red, one color beam having a wavelength corresponding to green, and one color beam corresponding to blue.

17. The projection system of claim 1, wherein the first fly-eye lens adjusts the width of the light beams so as to match the shape of the cylinder lens cells and thereby minimize light loss.

18. A method of projecting an image, comprising:
    emitting light beams of different wavelengths;
    transmitting the light beams respectively via optical fibers disposed between light emitting units and a collimating lens;
    separating the emitted light beams into a plurality of color beams and scrolling the color beams by rotating an optical element arranged so that rotation thereof simulates linear movement of the optical element, the optical element having at least two discrete cylinder lenses spirally arranged to form at least two spiraling cells respectively corresponding to the at least two discrete cylinder lenses cells on a single disk;
    focusing the color beams onto a light valve so as to form color bars corresponding to each of the colors in the plurality of color beams, the color beams received at different locations on the light valve;
    turning pixels of the light valve one of on and off according to a received image signal;
    adjusting the width of the light beams before the separating so as to minimize light loss; and controlling a width of the emitted light beams after the separating.

19. The method of claim 18, further comprising collimating the light beams before the separating.

20. A method of projecting an image, comprising:
emitting light beams of different wavelengths;
transmitting the light beams respectively via optical fibers disposed between the light emitting units and a collimating lens;
separating the emitted light beams into a plurality of color beams and scrolling the color beams by rotating an optical element arranged so that rotation thereof simulates linear movement of the optical element, the optical element having at least two discrete cylinder lenses spirally arranged to form at least two spiraling cells respectively corresponding to the at least two discrete cylinder lenses on a single disk;
focusing the color beams onto a light valve so as to form color bars corresponding to each of the colors in the plurality of color beams, the color beams received at different locations on the light valve;
turning pixels of the light valve one of on and off according to a received image signal;
adjusting the width of the light beams before the separating so as to minimize light loss; and
controlling a width of the emitted light beams after the separating,
wherein the optical element includes cylindrical lens cells located so as to be in the same positions, when the scrolling is performed at a frequency, as lens cells on a linearly traveling optical element scrolling color beams at the frequency.

21. A projector comprising:
a light emitting unit having a plurality of light emitting elements that emit light beams of different wavelengths along a light path;
an optical fibers disposed between the light emitting unit and a collimating lens to respectively transmit the light beams;
a scrolling unit rotatably disposed along the light path and having at least two discrete cylinder lenses spirally arranged to form at least two spiraling cells respectively corresponding to the at least two discrete cylinder lenses on a single disk that, when the scrolling unit is rotated, separate the light beams into color beams and scroll the color beams;
a light valve disposed at an end of the light path and forming a color image by receiving, at different locations, color beams transmitted from the scrolling unit and turning pixels one of off and on in accordance with an input image signal; and
a light beam width adjusting unit which adjusts the width of the light beams so that a shape of each of the light beams more closely matches the shape of the cylindrical lens cells that without width adjustment.

22. The projector of claim 21, further comprising a collimator disposed along the light path between the light emitting unit and the scrolling unit.

23. The projector of claim 21, wherein the light beam width adjusting unit includes a first cylinder lens disposed between the light emitting unit and the scrolling unit which controls the width of the light beams and a second cylinder lens disposed between the scrolling unit and the light valve which collimates the color beams.

24. An image projector comprising:
light emitters which emit light beams of different wavelengths;
optical fibers disposed between the light emitters and a collimating lens to respectively transmit the light beams;
a rotatable scrolling unit which separates the emitted light beams into a plurality of color beams and, when rotated, scrolls the color beams so as to simulate linear movement of the scrolling unit, the scrolling unit having a pair discrete cylindrical lenses spirally arranged to form at least two spiraling cells respectively corresponding to the pair of discrete cylinder lenses on a single disk;
a light valve which turns pixels on and off according to a received image signal; and
a color beam focusing unit which focuses the color beams onto the light valve so as to form color bars corresponding to each of the colors of the plurality of color beams, the color bars received at different locations on the light valve due to the scrolling.

* * * * *

UNITED STATES PATENT AND TRADEMARK OFFICE
CERTIFICATE OF CORRECTION

PATENT NO. : 7,163,293 B2  Page 1 of 1
APPLICATION NO. : 10/644883
DATED : January 16, 2007
INVENTOR(S) : Dae-sik Kim et al.

It is certified that error appears in the above-identified patent and that said Letters Patent is hereby corrected as shown below:

Title Page, Item (75), Column 1 (Inventors), Line 3, change "Suna-ha Kim" to --Sung-ha Kim--.

Signed and Sealed this

Tenth Day of April, 2007

JON W. DUDAS
*Director of the United States Patent and Trademark Office*